US010235572B2

(12) United States Patent
Cameron et al.

(10) Patent No.: US 10,235,572 B2
(45) Date of Patent: Mar. 19, 2019

(54) DETECTING CHANGES IN 3D SCENES

(71) Applicant: HEWLETT PACKARD ENTERPRISE DEVELOPMENT LP, Houston, TX (US)

(72) Inventors: Pashmina Cameron, Cambridge (GB); David Collier, Cambridge (GB)

(73) Assignee: ENTIT SOFTWARE LLC, Sunnyvale, CA (US)

(*) Notice: Subject to any disclaimer, the term of this patent is extended or adjusted under 35 U.S.C. 154(b) by 10 days.

(21) Appl. No.: 15/270,180

(22) Filed: Sep. 20, 2016

(65) Prior Publication Data
US 2018/0082128 A1 Mar. 22, 2018

(51) Int. Cl.
G06K 9/00 (2006.01)
G06K 9/46 (2006.01)
G06T 7/73 (2017.01)
G06T 7/579 (2017.01)

(52) U.S. Cl.
CPC ....... G06K 9/00771 (2013.01); G06K 9/4671 (2013.01); G06T 7/579 (2017.01); G06T 7/74 (2017.01); G06T 2207/10021 (2013.01); G06T 2207/10024 (2013.01); G06T 2207/10028 (2013.01)

(58) Field of Classification Search
CPC .................. G06K 9/00771; G06K 9/4671
See application file for complete search history.

(56) References Cited

U.S. PATENT DOCUMENTS

| 6,072,903 | A  | * | 6/2000  | Maki ........................ G06T 7/246 348/169 |
| 8,049,658 | B1 | * | 11/2011 | Lagonik ............... G01C 21/005 342/118 |
| 8,744,133 | B1 | * | 6/2014  | Troy ........................ G06T 7/001 382/106 |
| 8,913,791 | B2 | * | 12/2014 | Datta ...................... G06T 7/292 382/103 |
| 2003/0002712 | A1 | * | 1/2003  | Steenburgh ........ G06K 9/00778 382/103 |
| 2004/0218784 | A1 | * | 11/2004 | Nichani ................... G01V 8/10 382/103 |
| 2006/0228019 | A1 | * | 10/2006 | Rahmes ............. G06K 9/00637 382/154 |
| 2007/0263924 | A1 | * | 11/2007 | Kochi ..................... G01B 11/24 382/154 |
| 2012/0269387 | A1 | * | 10/2012 | Becker ................... G06T 7/254 382/103 |
| 2014/0369557 | A1 |   | 12/2014 | Kayombya et al. |

(Continued)

OTHER PUBLICATIONS http://www8.hp.com/h20195/v2/GetPDF.aspx/4AA6-4478ENN.pdf Title: Augmented Intelligence: Helping Humans Make Smarter Decisions Issue date: 2014.

(Continued)

Primary Examiner — John Strege

(57) ABSTRACT

Examples disclosed herein relate to detecting change in a 3-dimensional (3D) view. The examples enable determining a first set of sparse local features from a first set of frames of an initial 3D scene; determining whether the initial 3D scene is different from a current 3D scene based on the first set of sparse local features; and providing information about any determined differences between the initial 3D scene and the current 3D scene.

16 Claims, 6 Drawing Sheets

(56) References Cited

U.S. PATENT DOCUMENTS

2015/0009214 A1 1/2015 Lee et al.
2015/0098615 A1 3/2015 Lee et al.
2015/0254499 A1* 9/2015 Pang .................. G06K 9/00208
                                                       382/103

OTHER PUBLICATIONS https://homes.cs.washington.edu/~newcombe/papers/Salas-Moreno_etal_cvpr2013.pdf> Title: Slam ++: Simultaneous Localisation and Mapping at the Level of Objects Issue Date: May 8, 2013.
Aparna Taneja, et al., "Image Based Detection of Geometric Changes in Urban Environments", International Conference on Computer Vision, 2011, 8 pages.
Baowei Lin, et al., "Image Based Detection of 3D Scene Change", IEEJ Transactions on Electronics, Information and Systems, vol. 133, No. 1, 2013, 8 pages.
Joost Van de Weijer, et al,, "Coloring Local Feature Extraction", European Conference on Computer Vision, May 2006, 15 pages.
Julian Mason, "Object Discovery with a Mobile Robot", Jan. 1, 2013, 118 pages.
Kevin Matzen, et al., "Scene Chronology", European Conference on Computer Vision, 2014, 2 pages.
Wei-Wen Kao, et al., "Indoor navigation with smartphone-based visual SLAM and Bluetooth-connected wheel-robot", 2013 CACS International Automatic Control Conference (CACS), IEEE, Dec. 2, 2013, 6 pages.
Raul Mur-Artal, el al., "ORB-SLAM: A Versatile and Accurate Monocular SLAM System", IEEE Transactions on Robotics, vol. 31, No. 5, Oct. 1, 2015, 17 pages.
Thomas Pollard, et al., "Change Detection in a 3-D World" IEEE Conference on Computer Vision and Pattern Recognition, 2007, 6 pages.
Wei Tan, et al., "Robust Monocular SLAM in Dynamic Environments", IEEE International Symposium on Mixed and Augmented Reality (ISMAR), Oct. 1, 2013, 10 pages.
Zilong Dong, et al., "Keyframe-Based Real-Time Camera Tracking", IEEE 12th International Conference on Computer Vision, Sep. 29, 2009, 8 pages.

* cited by examiner

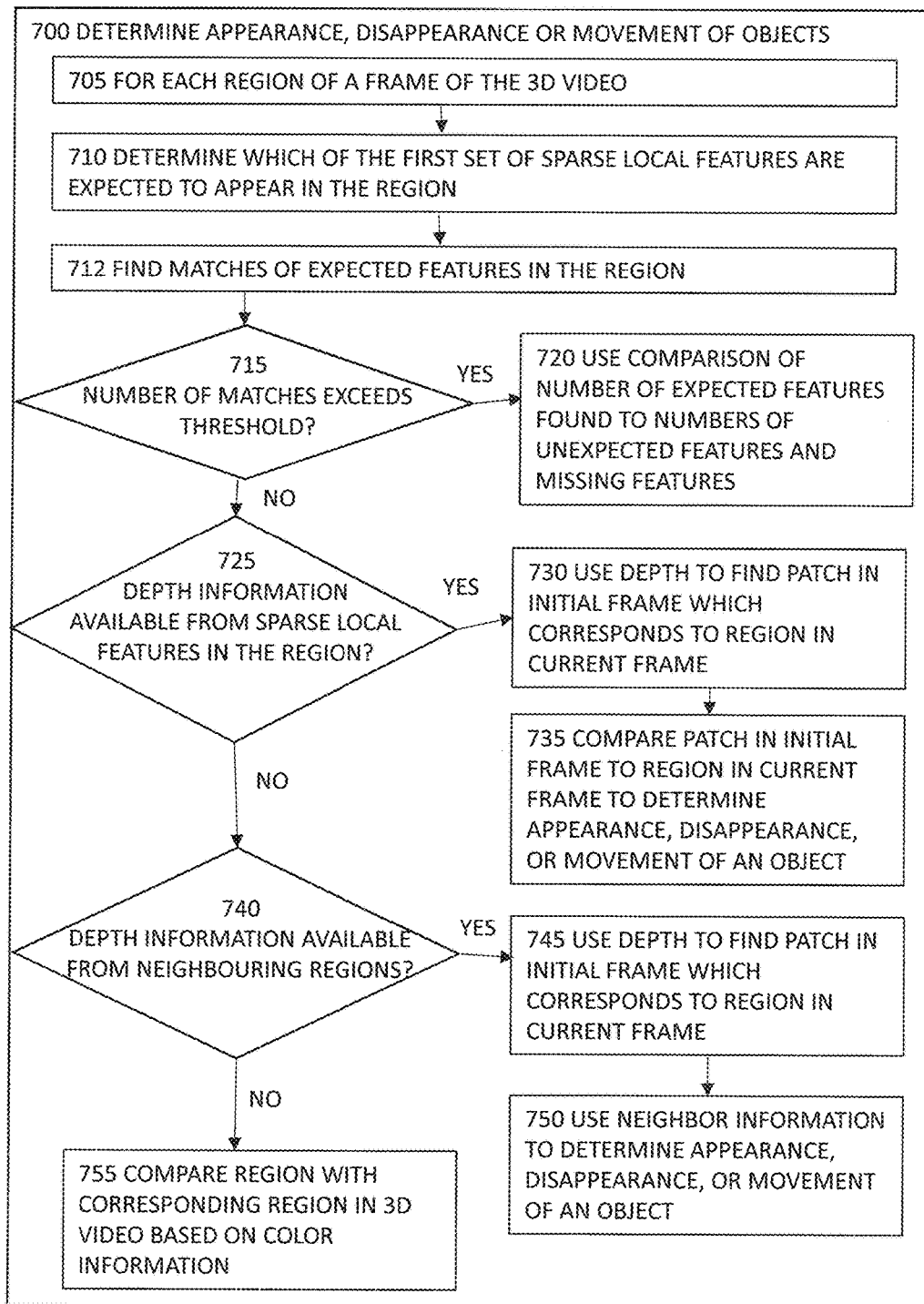

DETECTING CHANGES IN 3D SCENES

BACKGROUND

A vast amount of video data is captured by mobile phone cameras, surveillance cameras and television cameras. A large fraction of this data is highly repetitive, and there is growing demand for identifying the changes in two video clips of the same scene taken at different times. Change detection is an automated process that reduces the amount of data that a human has to inspect to find objects that have appeared, disappeared, or moved, to determine if there are defects in equipment, or to determine if suspicious movements have occurred.

BRIEF DESCRIPTION OF THE DRAWINGS

The following detailed description references the drawings, wherein:

FIG. 7 is a flow diagram depicting an example method for change detection.

DETAILED DESCRIPTION

Figure 1:
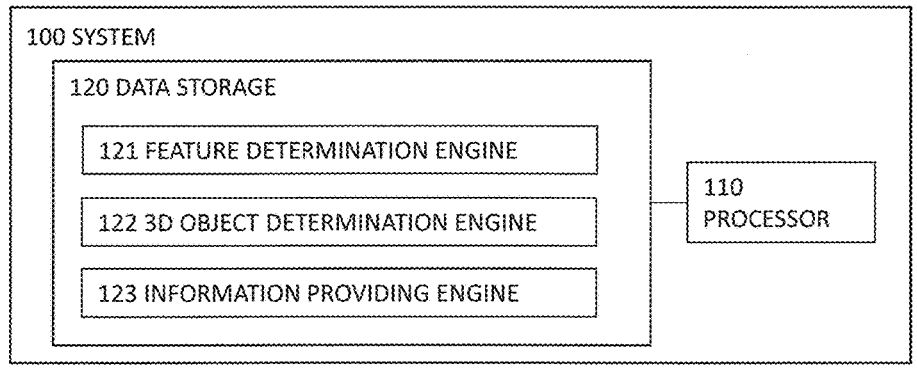
FIG. 1 is a block diagram depicting an example environment in which various examples may be implemented as a change detection system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for change detection. The disclosed examples may include systems, devices, computer-readable storage media, and methods for change detection. For purposes of explanation, certain examples are described with reference to the components illustrated in FIGS. 1-7. The functionality of the illustrated components may overlap, however, and may be present in a fewer or greater number of elements and components.

Figure 5:
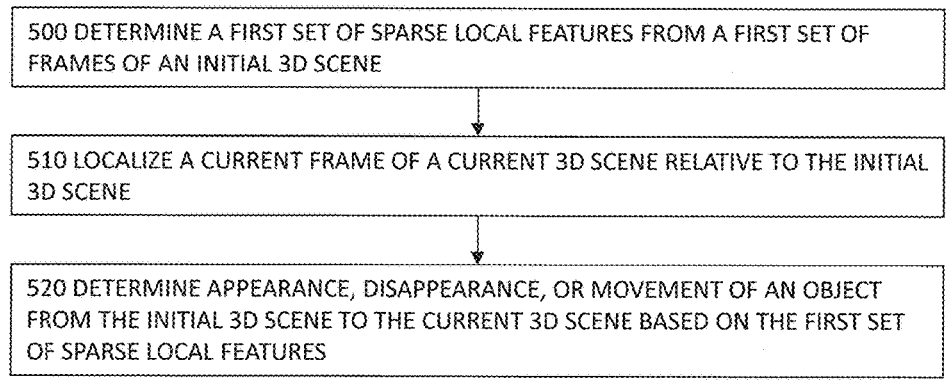
FIG. 5 is a flow diagram depicting an example method for change detection.
Figure 6:
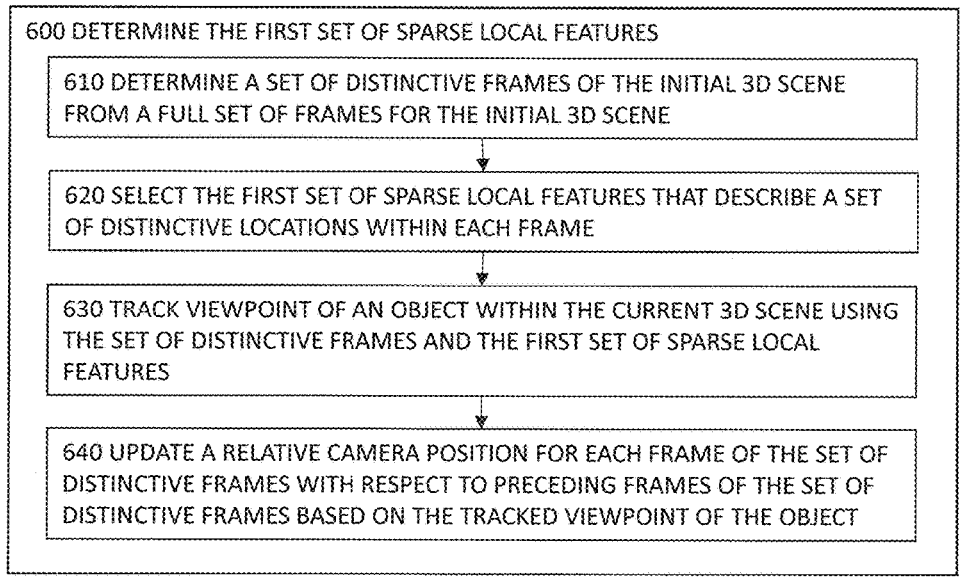
FIG. 6 is a flow diagram depicting an example method for change detection.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-7 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

A vast amount of video data is captured by mobile phone cameras, surveillance cameras and television cameras. A large fraction of this data is highly repetitive, and there is growing demand for identifying the changes in two video clips of the same scene taken at different times. Change detection includes an automated process that reduces the amount of data that a human has to inspect to find objects that have appeared, disappeared, or moved, to determine if there are defects in equipment, or to determine if suspicious movements have occurred.

Change detection may be done solely using two-dimensional methods if the camera is sufficiently far away from the scene being imaged, for example, in situations where the scene is being imaged by an overhead aerial vehicle. Change detection may need to be done using a combination of three-dimensional and two-dimensional methods in situations where the camera is at ground level, or if the camera is near the objects being images (e.g., where the relative size of the changes is large with respect to the camera's field of view).

Numerous technical issues exist with current change detection technology. The technology may only be available from a single camera that works on 2-dimensional information only (leading to suboptimal results). Alternatively, solutions may use full 3-dimensional reconstruction of video data and may be slow and inefficient.

Examples discussed herein address these technical issues by using 3D information to provide near real-time feedback to detect changes in a 3D scene without doing full 3D reconstruction. The technical solution discussed herein could work in real time on mobile devices and use input from only a single visual camera.

For example, a technical solution may facilitate detecting change in a 3-dimensional (3D) view by determining a first set of sparse local features from a first set of frames of an initial 3D scene. A determination may be made as to whether the initial 3D scene is different from a current 3D scene based on the first set of sparse local features. Next, information may be provided about any determined differences between the initial 3D scene and the current 3D scene.

In some examples, the technical solution may facilitate detecting change in a 3-dimensional (3D) view by also localizing a current frame of a current 3D scene relative to the initial 3D scene, wherein the current 3D scene occurs at a time later than the initial 3D scene.

In some examples, a set of distinctive frames of the initial 3D scene from a full set of frames for the initial 3D scene may be determined. The first set of sparse local features that describe a set of distinctive locations within each frame may be selected. A viewpoint of the object within the current 3D scene may be tracked using the set of distinctive frames and the first set of sparse local features. Next, a relative camera position for each frame of the set of distinctive frames may be updated with respect to preceding frames of the set of distinctive frames based on the tracked viewpoint of the object. In these examples, a camera position of the current frame of the current 3D scene may be localized relative to the initial 3D scene based on relative camera positions of each frame of the set of distinctive frames, the first set of sparse local features, and preceding frames of the current 3D scene.

Determining whether the current 3D scene is different from the initial 3D scene may include, for example, determining a current set of sparse local features expected to appear in the current 3D scene, and determining that the current 3D scene is different from the initial 3D scene responsive to a first sparse local feature of the current set of sparse local features not appearing in the current 3D scene or responsive to a new sparse local feature not in the current set of sparse local features appearing in the current 3D scene.

In some examples, determining whether the current 3D scene is different from the initial 3D scene may include, for example, dividing the current frame into set of current regions. A first current region of the set of current regions may be transformed to a viewpoint of the set of distinctive frames of the initial 3D scene using depth information from the current 3D scene. The first current region from the set of current regions may be compared to a corresponding region of the set of distinctive frames. Region comparison may be used to estimate change from the initial 3D scene to the current 3D scene.

In these examples, responsive to determining that depth information for the first current region of the current 3D scene does not exist, depth information from neighboring current regions of the first current region may be used to transform the second 3D frame to a reference viewpoint of the initial 3D scene. The transformed current 3D scene and the initial 3D scene may be compared.

Further in these examples, responsive to determining that the first current region and the neighboring current regions do not comprise depth information, color information of the set of current regions of the current 3D scene may be extracted. A determination may be made as to whether the initial 3D scene is different from the current 3D scene by comparing the extracted color information of the set of current regions of the current 3D scene with color information from a set of regions of the initial 3D scene.

In some examples, the initial 3D scene or the current 3D scene may be received from a mobile phone camera.

In some examples, a first stereo feed may be received from a first camera and a second stereo feed may be received from a second camera. In these examples, the initial 3D scene may be determined based on the first stereo feed, the second stereo feed, and depth information determined based on the first stereo feed and the second stereo feed.

FIG. 1 is an example environment 100 in which various examples may be implemented as a change detection system 100. In some examples, change detection system 100 may include various components such as a server computing device and client computing devices. Each client computing device may communicate requests to and/or receive responses from the server computing device. The server computing device may receive and/or respond to requests from client computing devices. In some examples, each client computing device may perform the functionality described herein without any communication to other devices. Client computing devices may be any type of computing device providing an interface through which a user can record 3D video and/or receive 3D video. For example, client computing devices may include a laptop computing device, a desktop computing device, an all-in-one computing device, a tablet computing device, a mobile phone, an electronic book reader, a set of cameras from which stereo feed may be received, and/or other electronic device suitable for recording 3D video.

According to various implementations, change detection system 100 and the various components described herein may be implemented in hardware and/or a combination of hardware and programming that configures hardware. Furthermore, in FIG. 1 and other Figures described herein, different numbers of components or entities than depicted may be used. In some examples, change detection system 100 may comprise a single client computing device that facilitates recording of 3D video.

Change detection system 100 may comprise a processor 110, a feature determination engine 121, a 3D object identification engine 122, an information providing engine 123, and/or other engines. The term "engine", as used herein, refers to a combination of hardware and programming that performs a designated function. As is illustrated with respect to FIGS. 3-4, the hardware of each engine, for example, may include one or both of a physical processor and a machine-readable storage medium, while the programming is instructions or code stored on the machine-readable storage medium and executable by the processor to perform the designated function.

Feature determination engine 121 may determine a first set of sparse local features from a first set of frames of an initial 3D scene. Feature determination engine 121 may access a current 3D scene that may occur at a time later than the initial 3D scene. System 100 may obtain the initial 3D scene and/or the current 3D scene from a client computing device of system 100 (e.g., a mobile camera or a set of cameras providing stereo feed), may record the 3D scenes, and/or may otherwise access the 3D scenes.

Feature determination engine 121 may determine a set of distinctive frames of the initial 3D scene from a full set of frames for the initial 3D scene. Feature determination engine 121 may select a first set of sparse local features that describe a set of distinctive locations within each frame. Feature determination engine 121 may track a viewpoint of the object within the current 3D scene using the set of distinctive frames and the first set of sparse local features. Feature determination engine 121 may also track a relative camera position for each frame of the set of distinctive frames and may update the relative camera position for each frame with respect to preceding frames of the set of distinctive frames based on the tracked viewpoint of the object. In these examples, feature determination engine 121 may localize a camera position of the current frame of the current 3D scene relative to the initial 3D scene based on relative camera positions of each frame of the set of distinctive frames, the first set of sparse local features, and preceding frames of the current 3D scene.

In some examples, feature determination engine 121 may determine the first set of sparse local features by generating a first SLAM map generated based on the initial 3D scene. The feature determination engine 122 may obtain sparse feature matching statistics from the first SLAM map. The feature determination engine 122 may use the sparse feature matching statistics from the first SLAM map and the viewpoint normalized local path matching discussed above to determine the first set of sparse local features.

In particular, in some examples, the feature determination engine 121 may divide the set of distinctive frames into a set of rectangular regions. For example, the reference run of FIG. 2A comprises an example of the regions of each frame. Each region may be a rectangular region of same or similar size as each other region. The feature determination engine 121 may determine a subset of sparse local features for each region.

In some examples, the feature determination engine 122 may determine a sparse local feature based on corner detection in the region. For example, the feature determination engine 121 may identify corners in the region based on corner detection and may select the identified corners as distinctive locations in the region. In some examples, the feature determination engine 121 may perform corner detection by identifying a location based on curvature of the gradient of the frame. For example, the feature determination engine 121 may identify a location responsive to the curvature exceeding a predetermined curvature threshold. In FIGS. 2A and 2B, locations (and corresponding sparse local features) may be depicted by the dots at the corners of objects identified in the various regions shown.

For each location that is identified, the feature determination engine 121 may create a sparse local feature for the location by creating a rich feature descriptor for the identified location. The rich feature descriptor may comprise information including a gradient distribution around the feature, depth information, feature type(s), size, location of the feature in the region of the frame, a corresponding object identifier that may be associated with the feature, information from the first SLAM map related to the feature and the identified location, and/or any other information related to the feature. The rich feature descriptor may also comprise, for example, an n-dimensional vector that represents a pixel patch for the location. In some examples, the amount of data stored in the n-dimensional vector for the sparse local feature should comprise enough information such that the feature can be identified from different viewpoints in different frames of the initial 3D scene. In some examples, the n-dimensional vector may be a 128 dimensional vector, with each dimension representing a different type of information about the sparse local feature, and the pixel patch may comprise a 16×16 pixel patch. These dimensions are purely examples and in no way limit the other sizes that the vector and the pixel patch could have. In some examples, the feature may comprise a robust invariant feature (e.g., OSID features), where the robust invariant feature may comprise the rich feature descriptor.

In some examples, a sparse local feature may be dependent on the region and the viewpoint of the camera in that region. As such, the sparse local feature may be independent of what the feature looks like in another perspective or viewpoint. In some examples, each region of the set of distinctive frames may have a different curvature threshold associated with it, such that the feature determination engine 121 may perform corner detection in a first region with a first curvature threshold, and may perform corner detection in a second region with a second curvature threshold. Given that, the feature determination engine 121 may identify a location as a sparse local feature in the first region that may or may not be identified as a sparse local feature in the second region.

In some examples, the curvature threshold for a region may be machine learned based on multiple frames of the initial 3D scene. In some examples, the curvature threshold for a region may be raised or lowered based on a number of locations initially identified by the feature determination engine 121.

Feature determination engine 121 may determine a second set of sparse local features from a second set of frames of the current 3D scene in a manner similar to or the same as the determination of the first set of sparse local features of the initial 3D scene.

Feature determination engine 121 may store information related to the initial 3D scene, current 3D scene, first set of sparse local features, second set of sparse local features, generated SLAM maps, and/or other information accessed, generated, or determined by feature determination engine 121. Feature determination engine 121 may store this information in data storage 120.

3D object determination engine 122 may identify a set of objects in the initial 3D scene. An object may comprise, for example, an object that may identified by a person viewing the frame. For example, the 3D object determination engine 122 may identify objects based on a collection of a subset of the first set of distinctive locations and corresponding set of sparse local features in a region. In some examples, the identified object may comprise a subset of sparse local features in the region that relate to a collection of pixels in the set of distinctive frames of the initial 3D scene that are different from a background of the set of distinctive frames by a predetermined threshold. The 3D object determination engine 122 may raise or lower the threshold based on a comparison of a ratio of the number of objects identified and a number of features in the first set of sparse local features.

The 3D object determination engine 122 may also determine a 3D position for each object within each region for the initial 3D scene. For example, the 3D object determination engine 122 may determine the 3D position based on tracking the sparse local features associated with the object across multiple sequential frames in the initial 3D scene to determine the position of the object relative to other features identified in the region. For example, 3D object determination engine 122 may track a viewpoint of the object within the initial 3D scene using the set of distinctive frames and the first set of sparse local features.

3D object determination engine 122 may also track a relative camera position for each frame of the set of distinctive frames and may update the relative camera position for each frame with respect to preceding frames of the set of distinctive frames based on the tracked viewpoint of the object. In these examples, 3D object determination engine 122 may localize a camera position of the current frame of the initial 3D scene based on relative camera positions of each frame of the set of distinctive frames, the first set of sparse local features, and preceding frames of the initial 3D scene.

3D object determination engine 122 may determine appearance, disappearance, or movement of an object from the initial 3D scene to the current 3D scene. For example, 3D object determination engine 122 may determine appearance, disappearance, or movement of an object from the initial 3D scene to the current 3D scene based on the determined set of objects of the initial 3D scene and the determined second set of objects of the current 3D scene. In particular, the 3D object determination engine 122 may determine appearance, disappearance, or movement of an object from the initial 3D scene to the current 3D scene responsive to a first sparse local feature of the current set of sparse local features not appearing in the current 3D scene or a new sparse local feature not in the current set of sparse local features appearing in the current 3D scene.

3D object determination engine 122 may transform each region of the set of current regions of the current 3D scene to a viewpoint of a corresponding region of the initial 3D scene. For example, the 3D object determination engine 122 may transform the regions of the current set of regions to the viewpoint of the regions of the initial 3D scene based on depth information obtained from the regions. 3D object determination engine 122 may obtain this depth information from the generated SLAM map for the initial 3D scene and the generated SLAM map for the current 3D scene. In some examples, the 3D object determination engine 122 may obtain the depth information for the corresponding regions from the first set of sparse local features of the initial 3D scene and the second set of sparse local features of the current 3D scene.

3D object determination engine 122 may compare a first current region of the current region to a corresponding initial region of the set of regions from the initial 3D scene. 3D object determination engine 122 may estimate change from the initial 3D scene to the current 3D scene based on the comparison of the first current region and the corresponding initial region. For example, FIG. 2B may depict the first set of regions of the initial 3D scene as the "Reference run" and the changes detected from each region of the initial 3D scene and a corresponding region of the current 3D scene as the "Changes". The 3D object determination engine 122 may estimate the change by determining appearance, disappearance, or movement of an object based on the comparison of each region of the initial 3D scene and a corresponding region of the current 3D scene.

In some examples, responsive to transforming a first current region of the current 3D scene to a viewpoint of a corresponding initial region of the initial 3D scene, 3D object determination engine 122 may determine which of the first set of sparse local features are expected to appear in the first current region. 3D object determination engine 122 may determine which of the expected first set of sparse local features match features in the second set of sparse local features determined for the first current region. 3D object determination engine 122 may determine whether a number of matching features exceeds a predetermined threshold.

Responsive to the number of matches exceeding the predetermined threshold, the 3D object determination engine 122 may compare the number of expected features that matched to a number of features in the second set of sparse local features that were not found and/or to a number of features in the first set of sparse local features that were not found in the first current region. The 3D object determination engine 122 may determine objects from the first set of objects of the initial 3D scene and/or the second set of objects of the current 3D scene that are associated with these unmatched or missing features.

In some examples, the 3D object determination engine 122 may use robust feature matching and/or normalized cross-correlation to compare the first current region and the corresponding initial region. For example, the 3D object determination engine 122 may perform the comparison by comparing a first vector comprising information about the corresponding initial region and a second vector comprising information about the first current region. Responsive to the vector associated with first current region having high variance, the vector for the first current region may be revised to take into account the high variance. In some examples, the 3D object determination engine 122 may revise each vector to have zero mean and unit variance before the vectors are matched. In some examples, 3D object determination engine 122 may remove brightness and contrast from the vectors, but may leave depth and texture information.

The 3D object determination engine 122 may use normalized cross-correlation responsive to determining that a high confidence in the appearance, disappearance, or movement of objects is needed, and may use robust feature matching to alleviate concerns about viewpoint variations. In some examples, the 3D object determination engine 122 may use both robust feature matching and normalized cross-correlation and may compare the results of each to determine appearance, disappearance, or movement of an object.

Responsive to the number of matches of features not exceeding the predetermined threshold, the 3D object determination engine 122 may determine whether depth information is available from the second set of sparse local features in the first current region. The 3D object determination engine 122 may determine that depth information is available from sparse local features in the first current region. Responsive to determining that the depth information is available, 3D object determination engine 122 may use the depth information to determine a patch in the set of distinctive frames of the initial scene that corresponds to the first current region and may compare the determined patch to the first current frame to determine appearance, disappearance, or movement of an object.

Responsive to determining that depth information is not available in the first current region (e.g., via the second set of sparse local features), 3D object determination engine 122 may determine whether depth information is available from a set of current neighbor regions (e.g., a 4-neighborhood, 9-neighborhood, and/or other configuration of neighborhood regions) that border the first current region. Responsive to determining that depth information is available from the set of neighboring regions, 3D object determination engine 122 may use the depth information to determine a patch in the first set of distinctive frames that corresponds to the first current region. 3D object determination engine 122 may use the depth information from the set of neighboring regions to determine appearance, disappearance, or movement of an object from the patch to the first current region.

Responsive to depth information not being available in the neighboring regions, 3D object determination engine 122 may compare the first current region with the corresponding initial region of the initial 3D scene based on color information to determine appearance, disappearance, or movement of an object from the initial 3D scene to the current 3D scene.

3D object determination engine 122 may store information related to the set of objects, determined camera positions of the objects and frames, changes detected between corresponding regions of the initial 3D scene and the current 3D scene, and/or other information related to the objects accessed, determined, compared, or generated by 3D object determination engine 122 in data storage 120.

Information providing engine 123 may provide information about changes detected from the initial 3D scene to the current 3D scene. For example, information providing engine 123 may provide information about objects that changed (e.g., appeared, disappeared, or moved) from the initial 3D scene to the current 3D scene. The information may comprise, for example, a list of objects, information about sparse local features associated with the objects that changed, information about corresponding regions that comprised objects that changed, information about ways in which the changed objects were determined, any combination thereof, and/or other information relating to change detected between the initial 3D scene and the current 3D scene.

Information providing engine 123 may provide this information via a display screen of the client computing device of change detection system 100, via an automated alert sent via email or other electronic communication method to a user of the client computing device, a user of the change detection system 100, an administrator of the change detection system 100, and/or other entity interested in the change detection system 100. Other methods of providing information about the changes detected between the initial 3D scene and the current 3D scene are feasible as well; the methods used are not limited to the examples described herein.

In performing their respective functions, engines 121-123 may access data storage 120 and/or other suitable database(s). Data storage 120 may represent any memory accessible to change detection system 100 that can be used to store and retrieve data. Data storage 120 and/or other databases communicably coupled to change detection system 100 may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Change detection system 100 may access data storage 120 locally or remotely via a network.

Data storage 120 may include a database to organize and store data. The database may reside in a single or multiple physical device(s) and in a single or multiple physical location(s). The database may store a plurality of types of data and/or files and associated data or file description, administrative information, or any other data.

Figure 2:
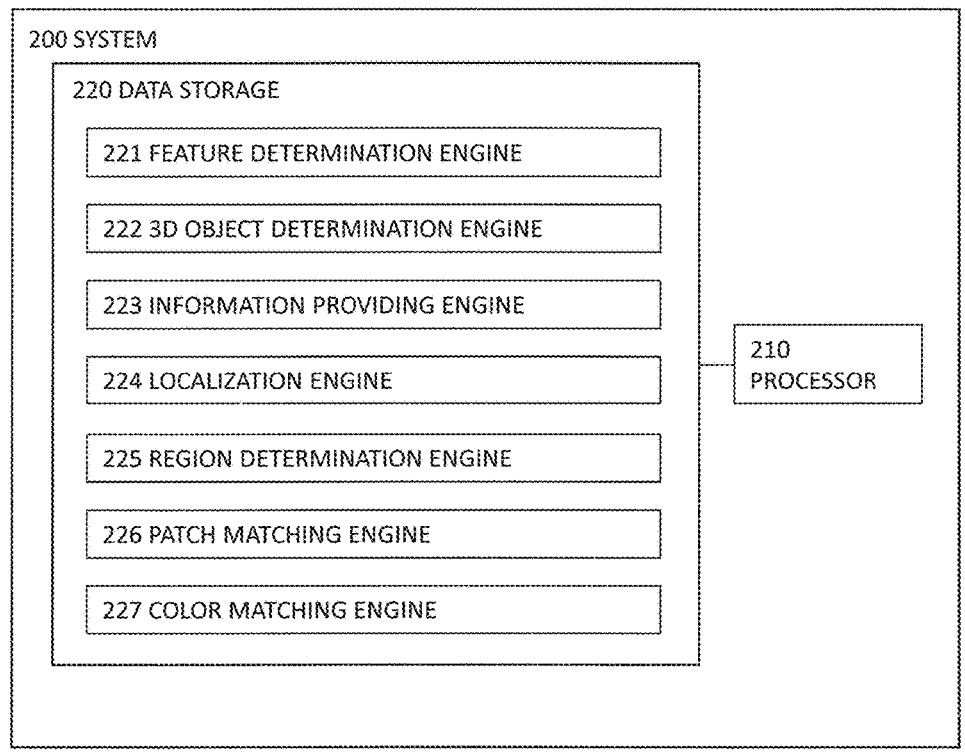
FIG. 2 is a block diagram depicting an example machine-readable storage medium comprising instructions executable by a processor for change detection.
Figure 2A:
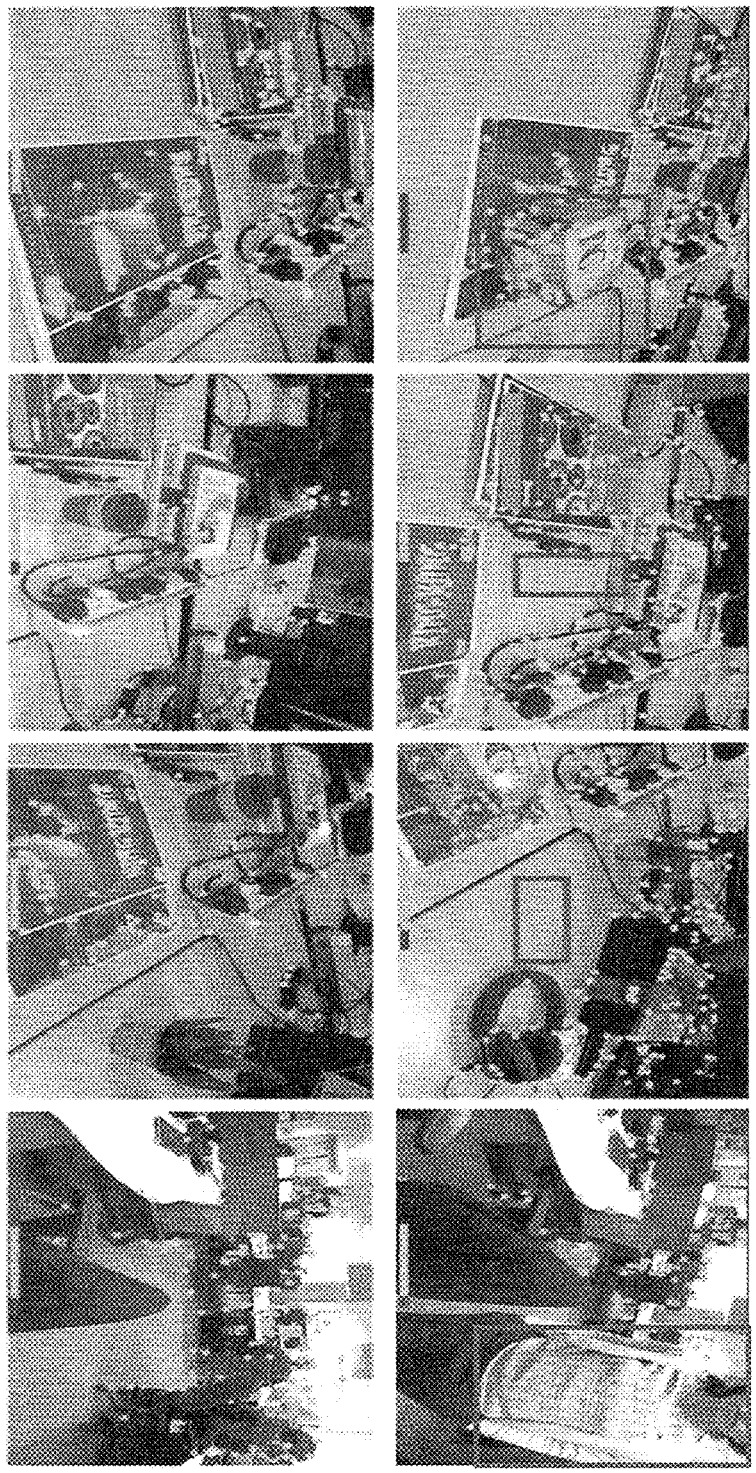
FIG. 2A is a diagram depicting an example reference run and test run of the change detection system.
Figure 2B:
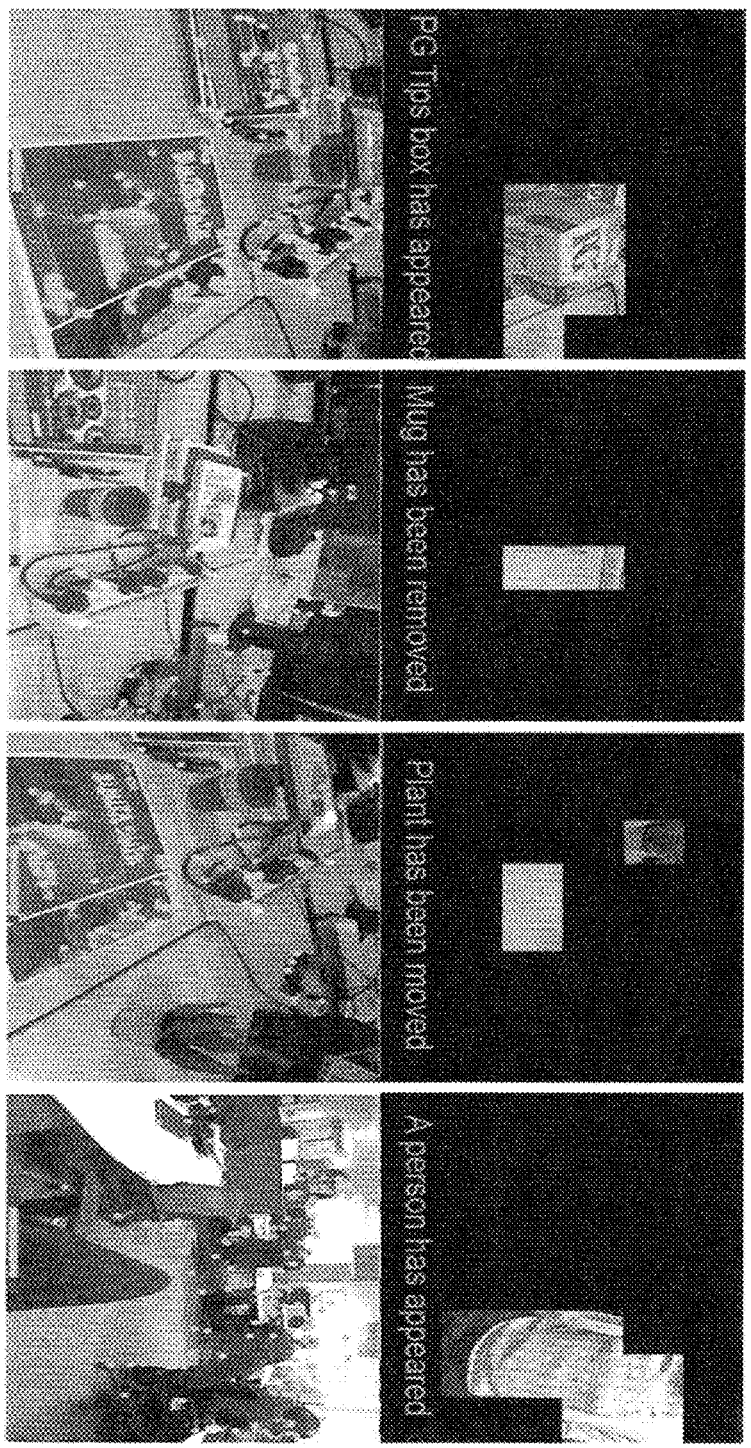
FIG. 2B is a diagram depicting an example reference run and example changes detected by a change detection system.

FIG. 2 is a block diagram depicting an example change detection system 200. Change detection system 210 may comprise a processor 210, feature determination engine 221, a 3D object identification engine 222, an information providing engine 223, a localization engine 224, a region determination engine 225, a patch matching engine 226, a color matching engine 227, and/or other engines. Engines 221-227 represent engines 121-123, respectively.

Figure 3:
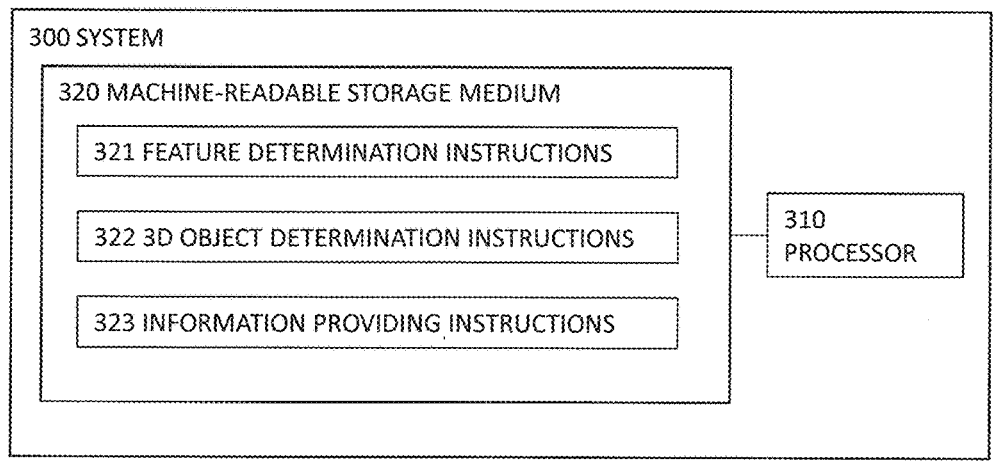
FIG. 3 is a block diagram depicting an example machine-readable storage medium comprising instructions executable by a processor for change detection.

FIG. 3 is a block diagram depicting an example machine-readable storage medium 310 comprising instructions executable by a processor for determining change detection.

In the foregoing discussion, engines 121-123 were described as combinations of hardware and programming. Engines 121-123 may be implemented in a number of fashions. Referring to FIG. 3, the programming may be processor executable instructions 321-323 stored on a machine-readable storage medium 310 and the hardware may include a processor 311 for executing those instructions. Thus, machine-readable storage medium 310 can be said to store program instructions or code that when executed by processor 311 implements change detection system 100 of FIG. 1.

In FIG. 3, the executable program instructions in machine-readable storage medium 310 are depicted as feature determination instructions 321, 3D object determination instructions 322, and information providing instructions 323. Instructions 321-323 represent program instructions that, when executed, cause processor 311 to implement engines 121-123, respectively.

Figure 4:
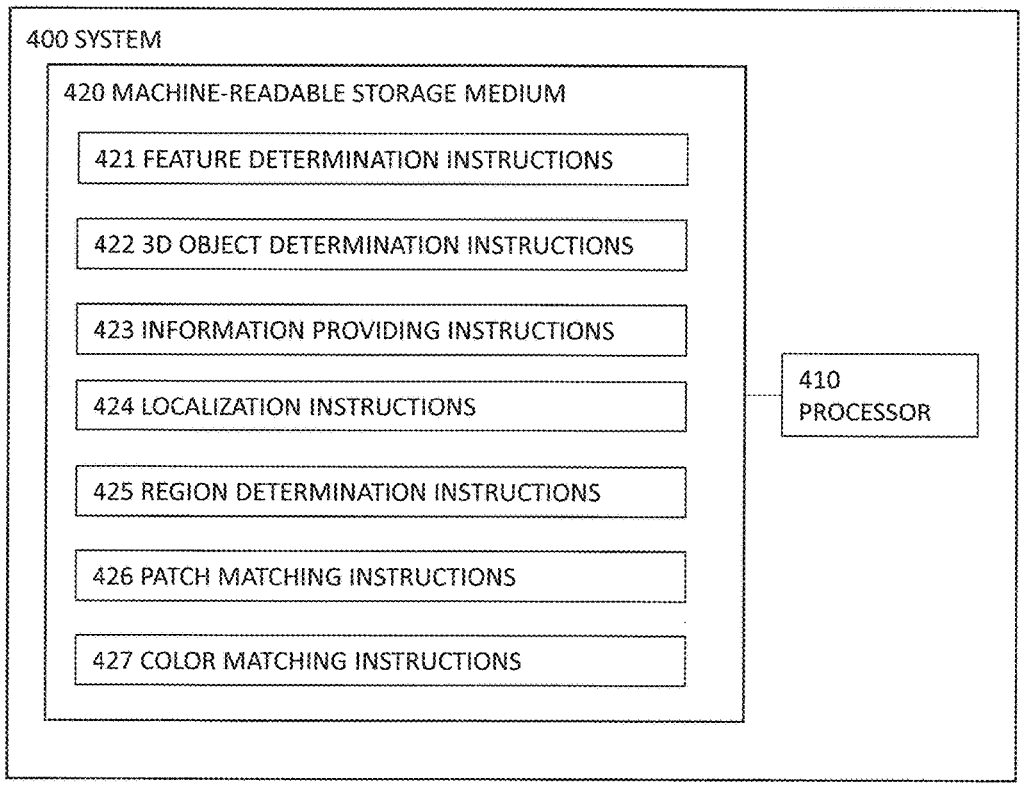
FIG. 4 is a block diagram depicting an example machine-readable storage medium comprising instructions executable by a processor for change detection.

FIG. 4 is a block diagram depicting an example machine-readable storage medium 420 comprising instructions executable by a processor for determining change detection.

In the foregoing discussion, engines 221-227 were described as combinations of hardware and programming. Engines 221-227 may be implemented in a number of fashions. Referring to FIG. 4, the programming may be processor executable instructions 421-427 stored on a machine-readable storage medium 420 and the hardware may include a processor 410 for executing those instructions. Thus, machine-readable storage medium 420 can be said to store program instructions or code that when executed by processor 410 implements change detection system 200 of FIG. 2.

In FIG. 4, the executable program instructions in machine-readable storage medium 410 are depicted as feature determination instructions 421, 3D object determination instructions 422, information providing instructions 423, localization instructions 424, region determination instructions 425, patch matching instructions 426, and color matching instructions 427. Instructions 421-427 represent program instructions that, when executed, cause processor 410 to implement engines 221-227, respectively.

Machine-readable storage medium 320 (or machine-readable storage medium 420) may be any electronic, magnetic, optical, or other physical storage device that contains or stores executable instructions. In some implementations, machine-readable storage medium 320 (or machine-readable storage medium 420) may be a non-transitory storage medium, where the term "non-transitory" does not encompass transitory propagating signals. Machine-readable storage medium 320 (or machine-readable storage medium 420) may be implemented in a single device or distributed across devices. Likewise, processor 310 (or processor 410) may represent any number of processors capable of executing instructions stored by machine-readable storage medium 320 (or machine-readable storage medium 420). Processor 310 (or processor 410) may be integrated in a single device or distributed across devices. Further, machine-readable storage medium 320 (or machine-readable storage medium 420) may be fully or partially integrated in the same device as processor 310 (or processor 410), or it may be separate but accessible to that device and processor 310 (or processor 410).

In one example, the program instructions may be part of an installation package that when installed can be executed by processor 310 (or processor 410) to implement change detection system 100. In this case, machine-readable storage medium 320 (or machine-readable storage medium 420) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 320 (or machine-readable storage medium 420) may include a hard disk, optical disk, tapes, solid state drives, RAM, ROM, EEPROM, or the like.

Processor 310 may be at least one central processing unit (CPU), microprocessor, and/or other hardware device suitable for retrieval and execution of instructions stored in machine-readable storage medium 320. Processor 310 may fetch, decode, and execute program instructions 321-323, and/or other instructions. As an alternative or in addition to retrieving and executing instructions, processor 310 may include at least one electronic circuit comprising a number of electronic components for performing the functionality of at least one of instructions 321-323, and/or other instructions.

Processor 410 may be at least one central processing unit (CPU), microprocessor, and/or other hardware device suitable for retrieval and execution of instructions stored in machine-readable storage medium 420. Processor 410 may fetch, decode, and execute program instructions 421-427, and/or other instructions. As an alternative or in addition to retrieving and executing instructions, processor 410 may include at least one electronic circuit comprising a number of electronic components for performing the functionality of at least one of instructions 421-427, and/or other instructions.

FIG. 5 is a flow diagram depicting an example method 500 for determining change detection. The various processing blocks and/or data flows depicted in FIG. 5 (and in the other drawing figures such as FIGS. 6 & 7) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method of FIG. 5 as illustrated (and described in greater detail below) is meant be an example and, as such, should not be viewed as limiting. The method of FIG. 5 may be implemented in the form of executable instructions stored on a machine-readable storage medium, such as storage medium 420, and/or in the form of electronic circuitry.

In an operation 500, a first set of sparse local features may be determined from a first set of frames of an initial 3D scene. For example, the system 100 (and/or the feature determination engine 121, the feature determination instructions 321, or other resource of the system 100) may determine the first set of sparse local features. The system 100 may determine the first set of sparse local features in a manner similar or the same as that described above in relation to the execution of the feature determination engine 121, the feature determination instructions 321, and/or other resource of the system 100.

In some examples, determining the first set of sparse local features may be done in several manners. FIG. 6 is a flow diagram depicting an example method for determining change detection. In particular, FIG. 6 shows an example of how to determine the first set of sparse local features (as discussed above with respect to operation 500). The method of FIG. 6 as illustrated (and described in greater detail below) is meant to be an example and, as such, should not be viewed as limiting. The method of FIG. 6 may be implemented in the form of executable instructions stored on a machine-readable storage medium, such as storage medium 320, and/or in the form of electronic circuitry.

In an operation 610, a set of distinctive frames of the initial 3D scene may be determined from a full set of frames for the initial 3D scene. For example, the system 100 (and/or the feature determination engine 121, the feature determination instructions 321, or other resource of the system 100) may determine the set of distinctive frames of the initial 3D scene. The system 100 may determine the set of distinctive frames of the initial 3D scene in a manner similar or the same as that described above in relation to the execution of the feature determination engine 121, the feature determination instructions 321, and/or other resource of the system 100.

In an operation 620, a first set of sparse local features may be selected that describe a set of distinctive locations with each frame. For example, the system 100 (and/or the feature determination engine 121, the feature determination instructions 321, or other resource of the system 100) may select the first set of sparse local features. The system 100 may select the first set of sparse local features in a manner similar or the same as that described above in relation to the execution of the feature determination engine 121, the feature determination instructions 321, and/or other resource of the system 100.

In an operation 630, a viewpoint of a 3D object within the current 3D scene may be tracked using the set of distinctive frames and the first set of sparse local features. For example, the system 100 (and/or the feature determination engine 121, the feature determination instructions 321, or other resource of the system 100) may track the viewpoint of the 3D object within the current 3D scene. The system 100 may track the viewpoint of the 3D object within the current 3D scene in a manner similar or the same as that described above in relation to the execution of the feature determination engine 121, the feature determination instructions 321, and/or other resource of the system 100.

In an operation 640, a relative camera position for each frame of the set of distinctive frames may be updated with respect to preceding frames of the set of distinctive frames based on the tracked viewpoint of the 3D object. For example, the system 100 (and/or the feature determination engine 121, the feature determination instructions 321, or other resource of the system 100) may update the relative camera position for each frame of the set of distinctive frames. The system 100 may update the relative camera position for each frame of the set of distinctive frames in a manner similar or the same as that described above in relation to the execution of the feature determination engine 121, the feature determination instructions 321, and/or other resource of the system 100.

Returning to FIG. 5, in an operation 510, a current frame of a current 3D scene may be localized relative to the initial 3D scene. For example, the system 100 (and/or the feature determination engine 121, the feature determination instructions 321, or other resource of the system 100) may localize the current frame of the current 3D scene relative to the initial 3D scene. The system 100 may localize the current frame of the current 3D scene relative to the initial 3D scene in a manner similar or the same as that described above in relation to the execution of the feature determination engine 121, the feature determination instructions 321, and/or other resource of the system 100.

In an operation 520, appearance, disappearance, or movement of an object from the initial 3D scene to the current 3D scene may be determined based on the first set of sparse local features. For example, the system 100 (and/or the 3D object determination engine 122, the 3D object determination instructions 322, or other resource of the system 100) may determine appearance, disappearance, or movement of an object from the initial 3D scene to the current 3D scene. The system 100 may ide determine appearance, disappearance, or movement of an object from the initial 3D scene to the current 3D scene in a manner similar or the same as that described above in relation to the execution of the 3D object determination engine 122, the 3D object determination instructions 322, and/or other resource of the system 100.

FIG. 7 is a flow diagram depicting an example method for determining change detection. In particular, FIG. 7 shows an example of how to determine the appearance, disappearance, or movement of objects (as discussed above with respect to operation 520). The method of FIG. 7 as illustrated (and described in greater detail below) is meant to be an example and, as such, should not be viewed as limiting. The method of FIG. 7 may be implemented in the form of executable instructions stored on a machine-readable storage medium, such as storage medium 420, and/or in the form of electronic circuitry.

In an operation 705, each frame of the 3D video may be divided into a set of regions, and the operations following operation 705 may be performed for each region of the frame of the 3D video. For example, the system 200 (and/or region determination engine 225, the region determination instructions 425, or other resource of the system 200) may divide the frame into the set of regions. The system 200 may divide the frame into the set of regions in a manner similar or the same as that described above in relation to the execution of the region determination engine 225, the region determination instructions 425, and/or other resource of the system 200.

In an operation 710, a determination may be made as to which of the first set of sparse local features are expected to appear in the region. For example, the system 200 (and/or 3D object determination engine 222, the 3D object determination instructions 422, or other resource of the system 200) may determine which of the first set of sparse local features are expected to appear in the region. The system 200 may determine which of the first set of sparse local features are expected to appear in the region in a manner similar or the same as that described above in relation to the execution of the 3D object determination engine 222, the 3D object determination instructions 422, and/or other resource of the system 200.

In an operation 712, matches of expected features may be found in the region. For example, the system 200 (and/or 3D object determination engine 222, the 3D object determination instructions 422, or other resource of the system 200) may find matches of expected features in the region. The system 200 may find matches of expected features in the region in a manner similar or the same as that described above in relation to the execution of the 3D object determination engine 222, the 3D object determination instructions 422, and/or other resource of the system 200.

In an operation 715, a determination may be made as to whether the number of matches exceeds a predetermined threshold. For example, the system 200 (and/or 3D object determination engine 222, the 3D object determination instructions 422, or other resource of the system 200) may determine whether the number of matches exceeds the predetermined threshold. The system 200 may determine whether the number of matches exceeds the predetermined threshold in a manner similar or the same as that described above in relation to the execution of the 3D object determination engine 222, the 3D object determination instructions 422, and/or other resource of the system 200.

In an operation 720, responsive to the number of matches exceeding the predetermined threshold, a comparison of the number of expected features found to the number of unexpected features and missing features may be made. For example, the system 200 (and/or 3D object determination engine 222, the 3D object determination instructions 422, or other resource of the system 200) may compare the number of expected features. The system 200 may determine the first set of sparse local features in a manner similar or the same as that described above in relation to the execution of the 3D object determination engine 222, the 3D object determination instructions 422, and/or other resource of the system 200.

In an operation 725, responsive to the number of matches not exceeding the predetermined threshold, a determination may be made as to whether depth information is available from the sparse local features in the region. For example, the system 200 (and/or patch matching engine 226, the patch matching instructions 426, or other resource of the system 200) may determine whether depth information is available from the sparse local features in the region. The system 200 may determine whether depth information is available from the sparse local features in the region in a manner similar or the same as that described above in relation to the execution of the patch matching engine 226, the patch matching instructions 426, and/or other resource of the system 200.

In an operation 730, responsive to determining that depth information is available from sparse local features in the region, the depth information may be used to find a patch in the reference frame that corresponds to the region in the current frame. For example, the system 200 (and/or patch matching engine 226, the patch matching instructions 426, or other resource of the system 200) may find a patch in the reference frame that corresponds to the region in the current frame. The system 200 may find a patch in the reference frame that corresponds to the region in the current frame in a manner similar or the same as that described above in relation to the execution of the patch matching engine 226, the patch matching instructions 426, and/or other resource of the system 200.

In an operation 735, the patch in the initial region may be compared to a region in the current frame to determine appearance, disappearance, or movement of an object. For example, the system 200 (and/or patch matching engine 226, the patch matching instructions 426, 3D object determination engine 222, 3D object determination instructions 422, or other resource of the system 200) may compare the patch in the initial region to a region in the current frame to determine appearance, disappearance, or movement of an object. The system 200 may compare the patch in the initial region to a region in the current frame to determine appearance, disappearance, or movement of an object may be compared to determine whether an object appeared, disappeared, or moved in a manner similar or the same as that described above in relation to the execution of the patch matching engine 226, the patch matching instructions 426, 3D object determination engine 222, 3D object determination instructions 422, and/or other resource of the system 200.

In an operation 740, responsive to determining that depth information is not available, a determination may be made as to whether depth information is available from a set of neighbor regions that border the region. For example, the system 200 (and/or patch matching engine 226, the patch matching instructions 426, or other resource of the system 200) may determine whether depth information is available from a set of neighbor regions that border the region. The system 200 may determine whether depth information is available from a set of neighbor regions that border the region in a manner similar or the same as that described above in relation to the execution of the patch matching engine 226, the patch matching instructions 426, and/or other resource of the system 200.

In an operation 745, responsive to determining that depth information is available from the set of neighboring regions, the depth information is used to find a patch in the initial frame that corresponds to the region in the current frame. For example, the system 200 (and/or patch matching engine 226, the patch matching instructions 426, or other resource of the system 200) may use depth information to find a patch in the initial frame that corresponds to the region in the current frame. The system 200 may use depth information to find a patch in the initial frame that corresponds to the region in the current frame in a manner similar or the same as that described above in relation to the execution of the patch matching engine 226, the patch matching instructions 426, and/or other resource of the system 200.

In an operation 750, the depth information from the set of neighboring regions is used to determine appearance, disappearance, or movement of an object. For example, the system 200 (and/or patch matching engine 226, the patch matching instructions 426, 3D object determination engine 222, 3D object determination instructions 422, or other resource of the system 200) may user neighbor information to determine appearance, disappearance, or movement of an object. The system 200 may use neighbor information to determine appearance, disappearance, or movement of an object in a manner similar or the same as that described above in relation to the execution of the patch matching engine 226, the patch matching instructions 426, 3D object determination engine 222, 3D object determination instructions 422, and/or other resource of the system 100.

In an operation 755, responsive to depth information not being available in the neighboring regions, the region may be compared with a corresponding region in the second 3D video based on color information to determine appearance, disappearance, or movement of an object. For example, the system 200 (and/or color matching engine 227, the color matching instructions 427, 3D object determination engine 222, 3D object determination instructions 422, and/or other resource of the system 200) may compare the region with the corresponding region in the second 3D video based on color information to determine appearance, disappearance, or movement of the object. The system 200 may compare the region with the corresponding region in the second 3D video based on color information to determine appearance, disappearance, or movement of the object in a manner similar or the same as that described above in relation to the execution of the color matching engine 227, the color matching instructions 427, 3D object determination engine 222, 3D object determination instructions 422, and/or other resource of the system 200.

The foregoing disclosure describes a number of example implementations for change detection. The disclosed examples may include systems, devices, computer-readable storage media, and methods for change detection. For purposes of explanation, certain examples are described with reference to the components illustrated in FIGS. 1-7. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-7 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for detecting change in a 3-dimensional (3D) view, the method comprising:
   determining, by a processor, a first set of sparse local features from a first set of frames of an initial 3D scene, wherein determining the first set of sparse local features comprises:
      determining a set of distinctive frames of the initial 3D scene from a full set of frames for the initial 3D scene;
      selecting the first set of sparse local features that describe a set of distinctive locations within each frame;
      tracking viewpoint of an object within the current 3D scene using the set of distinctive frames and the first set of sparse local features; and
      updating a relative camera position for each frame of the set of distinctive frames with respect to preceding frames of the set of distinctive frames based on the tracked viewpoint of the object;
   localizing, by the processor, a current frame of a current 3D scene relative to the initial 3D scene, wherein the current 3D scene occurs at a time later than the initial 3D scene; and
   determining, by the processor, appearance, disappearance, or movement of the object from the initial 3D scene to the current 3D scene based on the first set of sparse local features.

2. The method of claim 1, further comprising:
   localizing a camera position of the current frame of the current 3D scene relative to the initial 3D scene based on relative camera positions of each frame of the set of distinctive frames, the first set of sparse local features, and preceding frames of the current 3D scene.

3. The method of claim 1, wherein determining appearance, disappearance, or movement of an object from the initial 3D scene to the current 3D scene comprises:
   determining a current set of sparse local features expected to appear in the current 3D scene;
   determining that the current 3D scene is different from the initial 3D scene responsive to a first sparse local feature of the current set of sparse local features not appearing in the current 3D scene or a new sparse local feature not in the current set of sparse local features appearing in the current 3D scene.

4. The method of claim 1, wherein determining appearance, disappearance, or movement of an object from the initial 3D scene to the initial 3D scene comprises:
   dividing the current frame into a set of current regions;

transforming a first current region of the set of current regions to a viewpoint of the set of distinctive frames of the initial 3D scene using depth information from the current 3D scene;

comparing the first current region from the set of current regions to a corresponding region of the set of distinctive frames; and using region comparison to estimate change from the initial 3D scene to the current 3D scene.

5. The method of claim 4, further comprising:

responsive to determining that depth information for the first current region of the current 3D scene does not exist, using depth information from neighboring current regions of the first current region to transform the second 3D frame to a reference viewpoint of the initial 3D scene; and comparing the transformed current 3D scene and the initial 3D scene.

6. The method of claim 5, further comprising:

responsive to determining that the first current region and the neighboring current regions do not comprise depth information, extracting color information of the set of current regions of the current 3D scene; and determining whether the initial 3D scene is different from the current 3D scene by comparing the extracted color information of the set of current regions of the current 3D scene with color information from a set of regions of the initial 3D scene.

7. The method of claim 1, further comprising:

receiving the initial 3D scene or the current 3D scene from a mobile phone camera.

8. The method of claim 1, further comprising:

receiving a first stereo feed from a first camera and a second stereo feed from a second camera; and determining the initial 3D scene based on the first stereo feed, the second stereo feed, and depth information determined based on the first stereo feed and the second stereo feed.

9. A non-transitory machine-readable storage medium comprising instructions executable by a processor of a computing device for detecting change in a 3-dimensional (3D) view, the machine-readable storage medium comprising instructions that when executed by the processor cause the processor to:

determine a first set of sparse local features from a first set of frames of an initial 3D scene, wherein to determine the first set of sparse local features, the instructions are further to cause the processor to:

determine a set of distinctive frames of an initial 3D scene from a full set of frames for the initial 3D scene;

select the first set of sparse local features that describe a set of distinctive locations within each frame;

track viewpoint of an object within the current 3D scene using the set of distinctive frames and the first set of sparse local features; and update a relative camera position for each frame of the set of distinctive frames with respect to preceding frames of the set of distinctive frames based on the tracked viewpoint of the object;

localize a current frame of a current 3D scene relative to the initial 3D scene, wherein the current 3D scene occurs at a time later than the initial 3D scene;

determine whether the initial 3D scene is different from a current 3D scene based on the first set of sparse local features; and provide information about any determined differences between the initial 3D scene and the current 3D scene.

10. The non-transitory machine-readable storage medium of claim 9, wherein to determine whether the current 3D scene is different from the initial 3D scene, the instructions are further to cause the processor to:

determine a current set of sparse local features expected to appear in the current 3D scene;

determine that the current 3D scene is different from the initial 3D scene responsive to a first sparse local feature of the current set of sparse local features not appearing in the current 3D scene or a new sparse local feature not in the current set of sparse local features appearing in the current 3D scene.

11. The non-transitory machine-readable storage medium of claim 9, wherein the instructions are further to cause the processor to:

receive the initial 3D scene or the current 3D scene from a mobile phone camera.

12. A system for detecting change in a 3-dimensional (3D) view comprising:

a hardware processor that causes the system to:

determine a first set of sparse local features from a first set of frames of an initial 3D scene, wherein to determine the first set of sparse local features, the hardware processor is further to cause the system to:

determine a set of distinctive frames of the initial 3D scene from a full set of frames for the initial 3D scene;

select the first set of sparse local features that describe a set of distinctive locations within each frame;

track viewpoint of an object within the current 3D scene using the set of distinctive frames and the first set of sparse local features; and update a relative camera position for each frame of the set of distinctive frames with respect to preceding frames of the set of distinctive frames based on the tracked viewpoint of the object;

determine appearance, disappearance, or movement of the object from the initial 3D scene to a current 3D scene based on the first set of sparse local features, where the current 3D scene occurs at a time later than the initial 3D scene; and provide information about the appearance, disappearance, or movement of the object.

13. The system of claim 12, wherein the hardware processor causes the system to:

localize a current frame of a current 3D scene relative to the initial 3D scene, wherein the current 3D scene occurs at a time later than the initial 3D scene.

14. The system of claim 13, wherein, to determine appearance, disappearance, or movement of the object, the hardware processor causes the system to:

divide the current frame into set of current regions;

transform a first current region of the set of current regions to a viewpoint of the set of distinctive frames of the initial 3D scene using depth information from the current 3D scene;

compare the first current region from the set of current regions to a corresponding region of the set of distinctive frames; and use region comparison to estimate change from the initial 3D scene to the current 3D scene.

15. The system of claim 14, wherein, to determine appearance, disappearance, or movement of the object, the hardware processor causes the system to:

responsive to a determination that depth information for the first current region of the current 3D scene does not exist, use depth information from neighboring current regions of the first current region to transform the second 3D frame to a reference viewpoint of the initial 3D scene;

compare the transformed current 3D scene and the initial 3D scene;

responsive to a determination that the first current region and the neighboring current regions do not comprise depth information, extract color information of the set of current regions of the current 3D scene; and determine whether the initial 3D scene is different from the current 3D scene by comparing the extracted color information of the set of current regions of the current 3D scene with color information from a set of regions of the initial 3D scene.

16. The system of claim 12, wherein the hardware processor causes the system to:

receive the initial 3D scene or the current 3D scene from a mobile phone camera.

* * * * *